(12) United States Patent
Erickson et al.

(10) Patent No.: US 8,783,040 B2
(45) Date of Patent: Jul. 22, 2014

(54) METHODS AND SYSTEMS RELATING TO FUEL DELIVERY IN COMBUSTION TURBINE ENGINES

(75) Inventors: Dean Matthew Erickson, Simpsonville, SC (US); Timothy Russell Bilton, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1184 days.

(21) Appl. No.: 12/712,728

(22) Filed: Feb. 25, 2010

(65) Prior Publication Data

US 2011/0203291 A1  Aug. 25, 2011

(51) Int. Cl.
*F02C 1/00* (2006.01)

(52) U.S. Cl.
USPC ............................................ 60/772; 60/734

(58) Field of Classification Search
USPC ................ 60/772, 734, 736, 39.465, 776
See application file for complete search history.

(56) References Cited

U.S. PATENT DOCUMENTS

| | | | |
|---|---|---|---|
| 6,389,794 B2 | 5/2002 | Ranasinghe et al. | |
| 2005/0022537 A1* | 2/2005 | Lohn | 60/772 |
| 2006/0185367 A1* | 8/2006 | Hino et al. | 60/772 |
| 2007/0089485 A1* | 4/2007 | Antel et al. | 73/25.01 |
| 2008/0289339 A1* | 11/2008 | Asti et al. | 60/734 |

* cited by examiner

*Primary Examiner* — Phutthiwat Wongwian
*Assistant Examiner* — Scott Walthour
(74) *Attorney, Agent, or Firm* — Mark E. Henderson; Ernest G. Cusick; Frank A. Landgraff

(57) ABSTRACT

A fuel delivery system for a combustion turbine engine, comprising: a fuel line having a fuel compressor and parallel branches downstream of the fuel compressor: a cold branch that includes an after-cooler; and a hot branch that bypasses the after-cooler; a rapid heating value meter configured to measure the heating value of the fuel from the fuel source and transmit heating value data relating to the measurements; means for controlling the amount of fuel being directed through the cold branch and the amount of fuel being directed through the hot branch; and a fuel-mixing junction at which the cold branch and the hot branch converge; wherein the fuel-mixing junction resides in close proximity to a combustor gas control valve.

15 Claims, 9 Drawing Sheets

METHODS AND SYSTEMS RELATING TO FUEL DELIVERY IN COMBUSTION TURBINE ENGINES

BACKGROUND OF THE INVENTION

This present application relates generally to methods, systems, and apparatus for improving the efficiency, performance and operation of combustion turbine engines, which, as used herein and unless specifically stated otherwise, is meant to include all types of combustion turbine or rotary engines, including aircraft engines, the engines of power generating plants and others. More specifically, but not by way of limitation, the present application relates to methods, systems, and apparatus pertaining to fuel delivery in combustion turbine engines.

In general, gas turbine engines include a compressor, a combustor, and a turbine. The compressor and turbine generally include rows of blades that are axially stacked in stages. Each stage includes a row of circumferentially-spaced stator blades, which are fixed, and a row of rotor blades, which rotate about a central axis or shaft. In operation, generally, the compressor rotor blades rotate about the shaft, and, acting in concert with the stator blades, compress a flow of air. The supply of compressed air then is used in the combustor to combust a supply of fuel. The resulting flow of hot combusted gases is expanded through the turbine section. The flow of working fluid through the turbine induces the rotor blades to rotate. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electric power is generated.

It is known in the art to preheat a supply of fuel so that it may be delivered at an elevated temperature to the combustor. For several reasons, heated fuel promotes efficient engine operation. At times, it is necessary to vary the temperature of the fuel based on changing fuel characteristics. However, conventional fuel delivery systems have certain limitations that result in difficulties or delays in accurately controlling the temperature of fuel as it is delivered to the combustor. This may lead to the fuel being delivered at temperatures that are not acceptable.

More specifically, combustion turbine engines generally are designed to operate using fuels having certain characteristics relating to heating value. The heating value of a fuel, which also may be referred to as the gross calorific value, gross energy or Wobbe Index rating, generally describes the amount of heat or energy released when the fuel is combusted. In combustion turbine engine applications, though, the amount of energy released by a fuel being combusted through a fuel nozzle at a given pressure ratio may be more accurately described if the temperature at which the fuel is delivered to the nozzle is taken into account. The fuel characteristic that takes into account or compensates for the temperature of the fuel is generally referred to as the Modified Wobbe Index rating or MWI rating. Accordingly, this term will be used in this application; though, its usage is not intended to be limiting. (As used herein, Modified Wobbe Index rating or MWI rating is intended to broadly refer to a fuel measure describing the amount of energy released by a fuel being combusted through a fuel nozzle at a given pressure ratio that takes into account or compensates for the temperature at which the fuel is delivered to the nozzle.) Combustion turbine engines, therefore, are generally designed to operate with fuels that have a specific Modified Wobbe Index rating or fall within a range of acceptable Modified Wobbe Index ratings. This being the case, having the capability to modify or control the temperature of the fuel being delivered to the combustor (thereby modifying or controlling the Modified Wobbe Index rating of the fuel to a preferred range) is a useful way to insure the engine is using fuel that promotes efficient operation and reduces the risk of combustor damage.

However, given the limitations of conventional systems, as discussed in more detail below, variable fuel conditions often result in fuel being delivered to the combustor outside of the acceptable or targeted Modified Wobbe Index rating. Put another way, in conventional systems, fuel often is delivered to the combustor outside of a temperature range that provides the acceptable or targeted Modified Wobbe Index rating. This may result in damage to the combustor and inefficient engine performance. Further, it may result in a turbine engine "runback" situation, during which, generally, the operating system of the engine automatically reduces or cuts engine output to avoid engine damage that may occur because of the fuel not meeting engine specifications. Of course, sudden drops in engine output may come at inopportune moments, such as during peak demand, and result in significant issues in their own right.

In general, there are several reasons for these types of performance shortcomings in conventional fuel delivery systems. One of these is a thermal lag that occurs in manipulating fuel temperature. For example, in systems that include a fuel compressor that heats the fuel through compression and, then, cools a component of the heated flow through the use of a fuel after-cooler, this lag is due at least part by the location of the point at which the two flows are mixed. That is, per conventional systems, the two flows (i.e., the flow that is cooled by the after-cooler and the flow that is not cooled) are mixed in desired amounts so that a fuel supply having a desired temperature is delivered to the combustor. As discussed in more detail below, the location of the mixing point has an impact on the rate at which the temperature of the fuel flow as it enters the combustor may be altered.

Another issue is associated with the timely detection of variable fuel characteristics, such as heating value characteristic, within the fuel supply. The delay in detecting changing conditions makes it difficult to timely determine the appropriate temperature (or temperature range) at which the fuel should be delivered to the combustor. As a result, there is a need for improved methods, systems, and apparatus relating to the delivery of fuel in combustion turbine engines and, particularly, for effectively and efficiently controlling the temperature of the fuel in systems that use a fuel compressor at least intermittently, so that the fuel may be consistently delivered to the combustor at a temperature that is appropriate given its heating value and targeted Modified Wobbe Index rating for the engine.

BRIEF DESCRIPTION OF THE INVENTION

The present application thus describes a fuel delivery system for a combustion turbine engine, comprising: a fuel line having a fuel compressor positioned between a first connection to a fuel source and a second connection to the combustor of the combustion turbine engine, wherein the fuel line further comprises parallel branches downstream of the fuel compressor: a cold branch that includes an after-cooler; and a hot branch that bypasses the after-cooler; a rapid heating value meter configured to measure the heating value of the fuel from the fuel source and transmit heating value data relating to the measurements; means for controlling the amount of fuel being directed through the cold branch and the amount of fuel being directed through the hot branch; and a fuel-mixing junction at which the cold branch and the hot branch converge; wherein the fuel-mixing junction resides in close proximity to a combustor gas control valve.

The present application further describes a method of controlling the delivery of fuel to a combustor of a combustion turbine engine, wherein a fuel delivery system of the combustion turbine engine includes: a fuel line having a fuel compressor positioned between a first connection to a fuel source and a second connection to the combustor of the combustion turbine engine, wherein the fuel line further comprises parallel branches downstream of the fuel compressor: a cold branch that includes an after-cooler; and a hot branch that bypasses the after-cooler; a rapid heating value meter configured to measure the heating value of the fuel from the fuel source and transmit heating value data relating to the measurements; means for controlling the amount of fuel being directed through the cold branch and the amount of fuel being directed through the hot branch; and a fuel-mixing junction positioned in close proximity to the a combustor gas control valve at which the cold branch and the hot branch converge; the method including the steps of: measuring the heating value of the fuel with the rapid heating value meter; determining a target temperature range for the fuel based on the measured heating value and a target Modified Wobbe Index range of the combustor; and controlling the flow of fuel through the cold branch and the hot branch such that the temperature of the fuel being delivered to the combustor comprises a temperature within the target temperature range.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
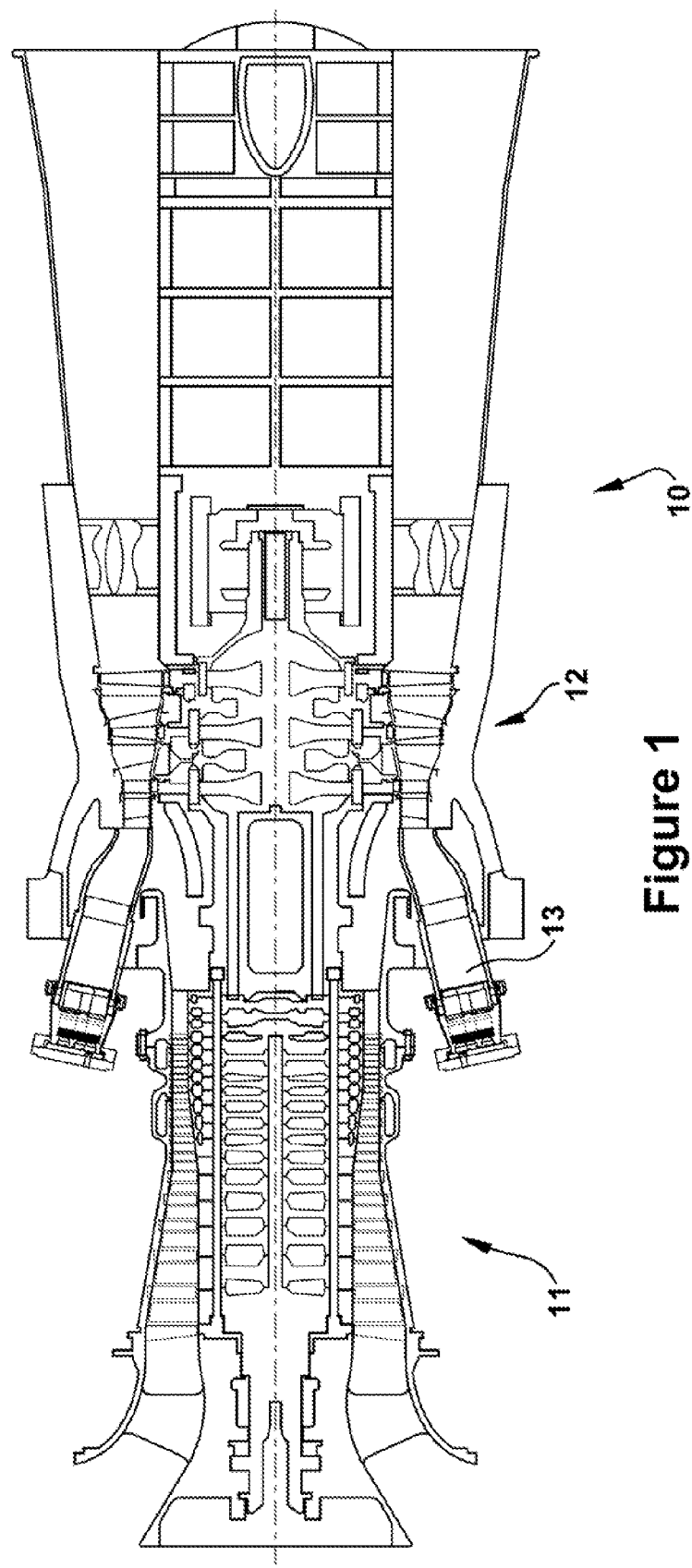
FIG. 1 is a schematic representation of an exemplary turbine engine in which certain embodiments of the present application may be used.

Referring now to the figures, FIG. 1 illustrates a schematic representation of a gas turbine engine 10, which will be used to describe an exemplary environment in which the present invention may be employed. It will be understood by those skilled in the art that the present invention is not limited to this type of usage. As stated, the present invention may be used in other types of gas turbine engines.

In general, gas turbine engines operate by extracting energy from a pressurized flow of hot gas that is produced by the combustion of a fuel in a stream of compressed air. As illustrated in FIG. 1, gas turbine engine 10 may be configured with an axial compressor 11 that is mechanically coupled by a common shaft or rotor to a downstream turbine section or turbine 12, and a combustor 13 positioned between the compressor 11 and the turbine 12.

Figure 2:
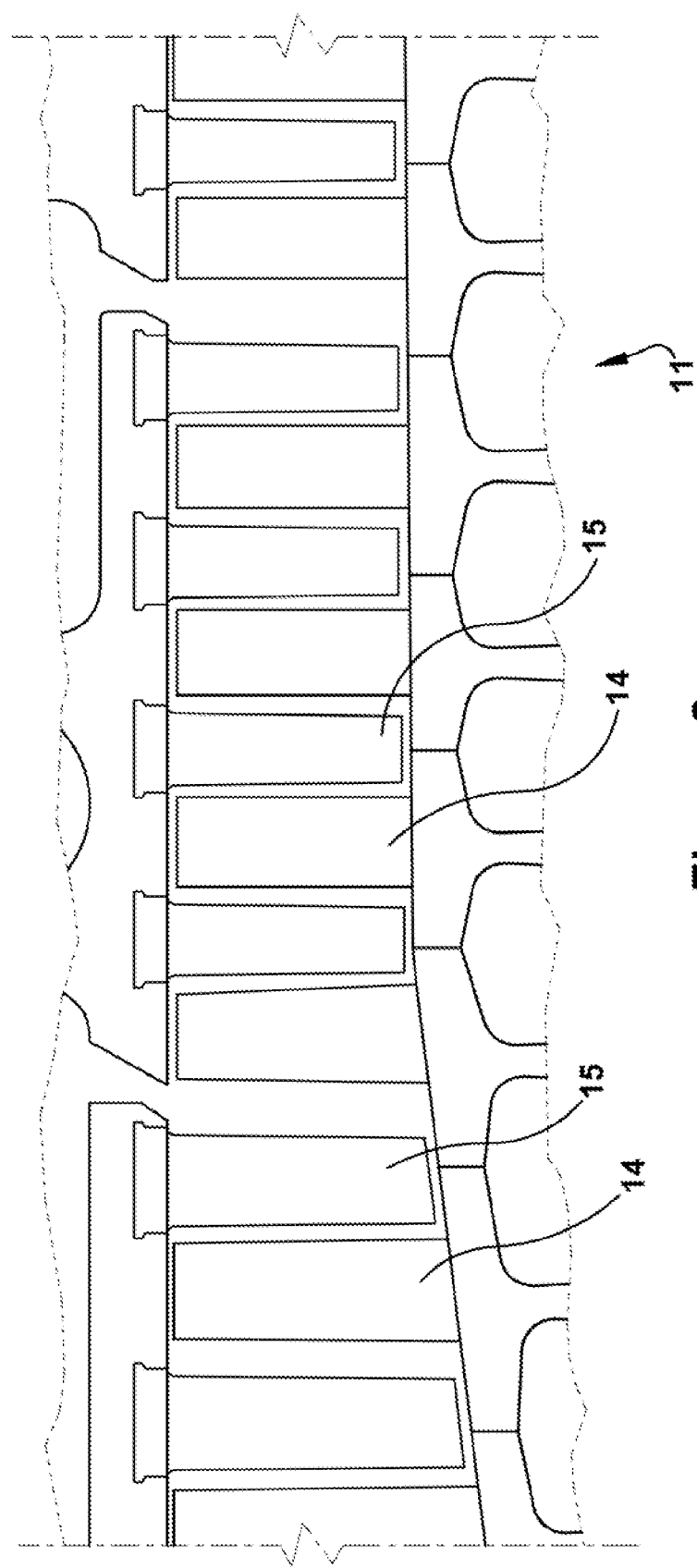
FIG. 2 is a sectional view of the compressor section of the gas turbine engine of FIG. 1.

FIG. 2 illustrates a view of an exemplary multi-staged axial compressor 11 that may be used in the gas turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation. The compressor stator blades 15 generally are circumferentially spaced one from the other and fixed about the axis of rotation. The compressor rotor blades 14 are circumferentially spaced and attached to the shaft; when the shaft rotates during operation, the compressor rotor blades 14 rotate about it. As one of ordinary skill in the art will appreciate, the compressor rotor blades 14 are configured such that, when spun about the shaft, they impart kinetic energy to the air or fluid flowing through the compressor 11. The compressor 11 may have other stages beyond the stages that are illustrated in FIG. 2. Additional stages may include a plurality of circumferential spaced compressor rotor blades 14 followed by a plurality of circumferentially spaced compressor stator blades 15.

Figure 3:
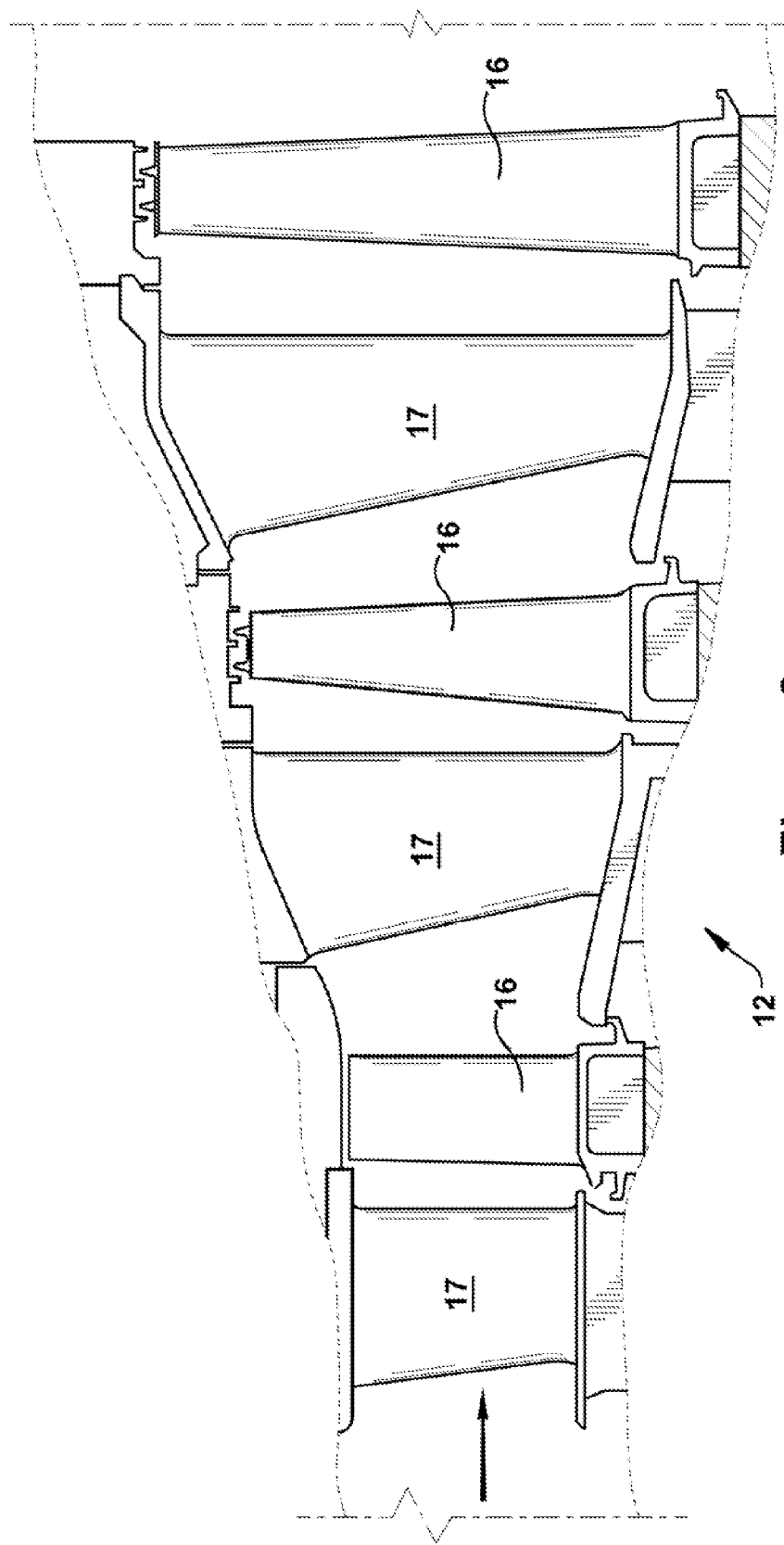
FIG. 3 is a sectional view of the turbine section of the gas turbine engine of FIG. 1.

FIG. 3 illustrates a partial view of an exemplary turbine section or turbine 12 that may be used in the gas turbine engine of FIG. 1. The turbine 12 also may include a plurality of stages. Three exemplary stages are illustrated, but more or less stages may present in the turbine 12. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 12 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot gas path of the turbine 12. The direction of flow of the hot gases through the hot gas path is indicated by the arrow. As one of ordinary skill in the art will appreciate, the turbine 12 may have other stages beyond the stages that are illustrated in FIG. 3. Each additional stage may include a row of turbine stator blades followed by a row of turbine rotor blades 16.

In use, the rotation of compressor rotor blades 14 within the axial compressor 11 may compress a flow of air. In the combustor 13, energy may be released when the compressed air is mixed with a fuel and ignited. The resulting flow of hot gases from the combustor 13, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

To communicate clearly the invention of the current application, it may be necessary to select terminology that refers to and describes certain machine components or parts of a turbine engine. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often certain components may be referred to with several different names. In addition, what may be described herein as a single part may include and be referenced in another context as consisting of several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component as described herein.

In addition, several descriptive terms that are common to turbine engine applications may be used herein. The definitions for these terms are as follows. The term "downstream" and "upstream" are terms that indicate a direction relative to the flow of working fluid through the turbine or a condo. As such, the term "downstream" means in the direction of the flow, and the term "upstream" means in the opposite direction of the flow through the turbine. Related to these terms, the terms "aft" and/or "trailing edge" refer to the downstream direction, the downstream end and/or in the direction of the downstream end of the component being described. And, the terms "forward" or "leading edge" refer to the upstream direction, the upstream end and/or in the direction of the upstream end of the component being described. The term "radial" refers to movement or position perpendicular to an axis. It is often required to describe parts that are at differing radial positions with regard to an axis. In this case, if a first component resides closer to the axis than a second component, it may be stated herein that the first component is "inboard" or "radially inward" of the second component. If, on the other hand, the first component resides further from the axis than the second component, it may be stated herein that the first component is "outboard" or "radially outward" of the second component. The term "axial" refers to movement or position parallel to an axis. And, the term "circumferential" refers to movement or position around an axis.

Figure 4:
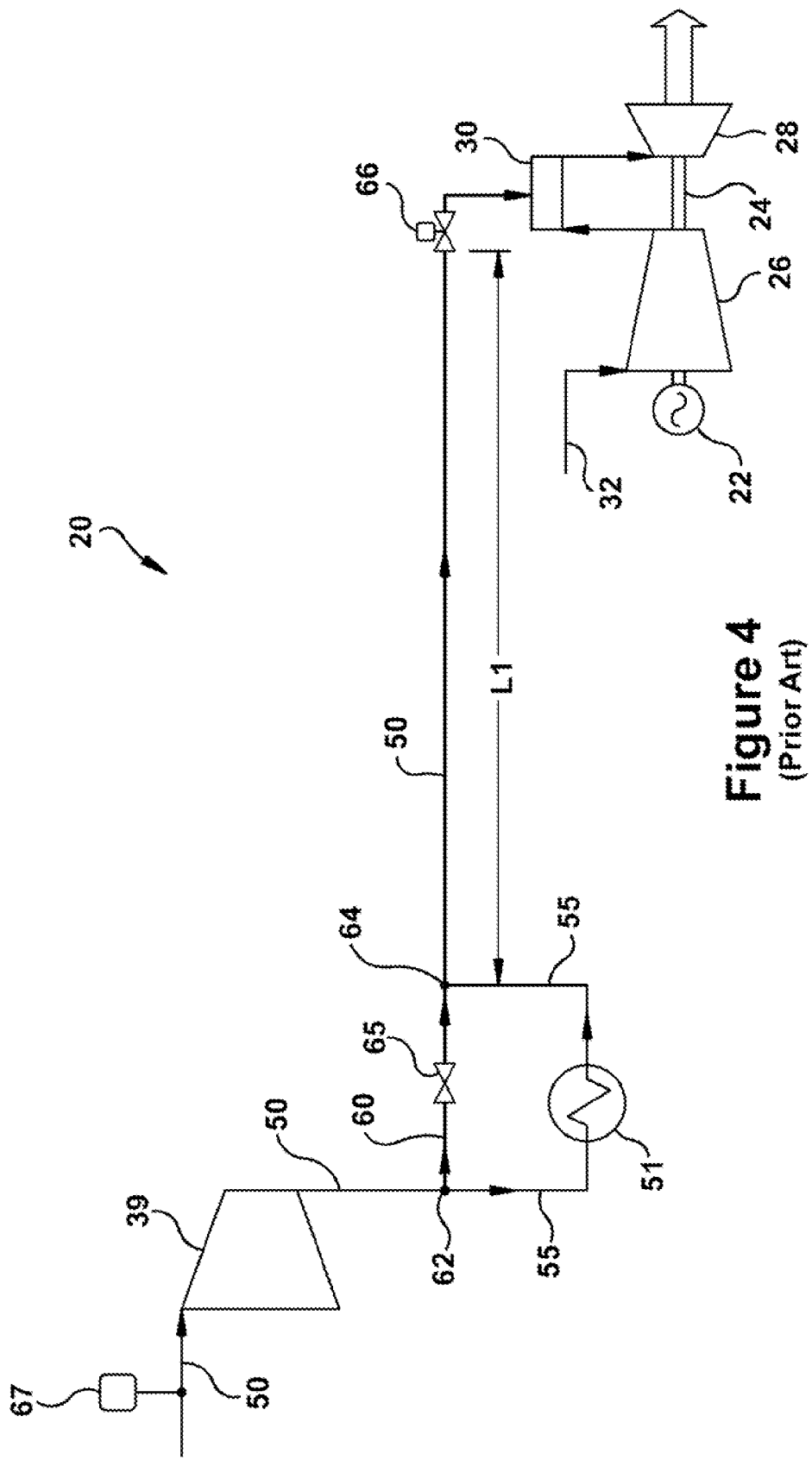
FIG. 4 is a schematic representation of a fuel delivery system of a combustion turbine system according to conventional design.

Referring again to the figures, FIG. 4 illustrates an example of a combustion turbine system according to conventional design: a combustion turbine system 20. The combustion turbine system 20 may include an electric generator 22 that is connected by a rotor shaft 24 to a compressor 26 and a turbine 28. The connections and configuration of these components may be made pursuant to conventional technology. A combustor 30 may be positioned between the compressor 26 and the turbine 28. As shown, an air intake line 32 may be connected to the compressor 26. The air intake line 32 provides the inlet to the compressor 26. A first conduit then may connect the compressor 26 to the combustor 30 and may direct the air that is compressed by the compressor 26 into the combustor 30. As described above, the combustor 30 generally combusts the supply of compressed air with a fuel in a know manner to produce a hot compressed motive gas. The motive gas is conducted from the combustor 30 by a second conduit and directed to the turbine 28. The supply of combustion gases drives the turbine 28. The turbine 28, driven by the motive gas turns rotor shaft 24, rotates the shaft or rotor shaft 24, the energy of which may be used to drive the compressor 26 and the generator 22, thereby producing electricity.

The turbine system 20 may further include a fuel compressor 39. It will be appreciated that combustion turbine engines often require fuel compressors so that supply pressure requirements of the combustor are satisfied during operation. Depending on the system and the supply of fuel available, the fuel compressor 39 may be used intermittently (i.e., when needed to boost the pressure of the fuel supply) or constantly (i.e., when the pressure of the fuel always needs boosting so that it is delivered to the combustor at a desired pressure). It will be appreciated that, when in use, the fuel compressor 39 heats the fuel supply through due to the heat of compression.

A fuel line 50 may extend through the fuel compressor 39 from a fuel source (not shown) to the combustor 30 for delivering fuel to the combustor 30. The fuel line 50 may convey a liquid fuel or a gaseous fuel such as methane as is customary in combustion turbine systems. As stated, through the compression process, the fuel is heated as it flows through the fuel compressor 39. A conventional system generally includes a fuel after-cooler or after-cooler (hereinafter "after-cooler 51") that, when necessary, removes heat from the supply of fuel. As used herein, an after-cooler 51 refers to a conventional system component that may be used to remove heat from a supply of fuel. For example, the after-cooler 51 may be an air to gas heat exchanger, a liquid to gas heat exchanger, or another component that may be used to complete the function of removing heat from the supply of fuel.

As shown in FIG. 4, given these components, the fuel line 50 may be described as having two parallel branches. The first branch is the branch that directs the fuel through the after-cooler 51. This branch will be referred to herein as a cold branch 55. The second branch, which will be referred to herein as a hot branch 60, is the branch that bypasses the after-cooler 51. Note that as used herein, "cold" and "hot" are used only the distinguish the relative temperature of the fuel flowing through each branch in comparison to the other branch. That is, the "hot" branch 60 generally carries a fuel supply that has a higher temperature than the fuel supply that is carried by the "cold" branch 55. As shown, the cold branch 55 and the hot branch 60 may diverge at a point that is upstream of the after-cooler 51 and downstream of the fuel compressor 39. This point is referred to herein as an upstream fork 62. Then, the cold branch 55 and the hot branch 60 may converge at a point that is downstream of the after-cooler 51 and upstream of the combustor 30. This point is referred to herein as a fuel-mixing junction 64. In this manner, it will be appreciated that the parallel fuel lines allow some fuel to bypass the after-cooler 51. One or more valves may be used to control the amount of fuel that travels through the hot branch 60 and the amount of fuel that travels through the cold branch 55 so that a desired amount flows through each. As shown, this may be done using a single two-way valve 65 positioned in the hot branch 60. Other valve configurations for controlling this flow in a desired manner are also possible. In addition, the system may include other components, such as check-valves, which are not shown, that maintain the direction of flow (as indicated by the arrows on the lines) and prevent backflow. This is also true throughout FIGS. 5 through 8.

Given the configuration of the system 20, the valve 65 may be used to regulate the amount of fuel that bypasses the after-cooler 51, and, by doing this, the valve 65 may be used to control the temperature of the supply of fuel flowing to the combustor 30. That is, by manipulating the amount of the fuel supply that bypasses the after-cooler 51 and then combining the cooled and not cooled flows of fuel downstream, the conventional turbine system 20 may at least partially control the temperature of the fuel that is delivered to the combustor 30.

As discussed in more detail below, however, in operation, conventional systems have a temperature lag that makes relatively timely and accurate fuel temperature modifications or regulation substantially ineffective. Among other reasons, this is because conventional systems, such as the one shown in FIG. 4, include a relatively lengthy stretch of fuel line 50 between the fuel-mixing junction 64 and the combustor 30. This stretch of fuel line generally terminates at a valve just upstream of the combustor 30, which herein is referred to as a combustor gas control valve 66. As illustrated in FIG. 4, this distance is referenced as distance "L1", and indicates the length of conduit between the fuel-mixing junction 64 and the combustor gas control valve 66 or the inlet of the combustor 30. In conventional systems, the distance L1 is at least greater than 20 m, and, typically, greater than 50 m. The lengthy run of conduit between the mixing junction 64 and the combustor 30 makes the relatively quick adjustment of the temperature of the fuel being delivered to the combustor 30 impossible. It will be appreciated that this delay is caused by the heat sink properties of the length of conduit that resist changing fuel temperatures and/or the required purging of fuel already in the conduit before fuel of an adjusted temperature may be delivered to the combustor 30.

In some instances, conventional systems also may include a conventional gas chromatograph 67 or other similar device. As one of ordinary skill would appreciate, a gas chromatograph 67 may be used to test the fuel supply to determine the makeup of its separate components and/or its heating value. More particularly, the gas chromatograph 67 may be used to sample the fuel supply and measure the relative amount of its various components. In this manner, a conventional system may determine the breakdown of the different hydrocarbons within the supply of fuel and provide data relating to the heating value of the fuel supply. Generally, however, there is a significant time delay associated with the gas chromatograph 67 and the other similar testing devices generally used in conventional systems. That is, there is a significant delay between the time the chromatograph 67 takes a sample from the fuel supply and provides a control system with the relevant or necessary test results or information relating to the chemical makeup or heating value of a fuel. The delay associated with a chromatograph (and/or the other similar devices generally used in conventional systems for the same purpose) is relatively considerable (often several minutes or more), and, as discussed in more detail below, often provided after modifications to the engine control settings are necessary (i.e., test results that are not "timely"). In other words, the test results are provided too late. The chromatograph and/or the other similar devices do not provide readily available and timely information as to the heating value of the fuel supply, which may lead to fuel being delivered to the engine outside of the engine's targeted Modified Wobbe Index range. This may result in engine damage, runbacks, or other performance issues. In many cases, this delay is exacerbated by the temperature lag discussed above.

As one of ordinary skill in the art will appreciate, in addition to the components shown, the combustion turbine system 20 as well as the combustion turbine systems of the exemplary embodiments described hereafter, i.e., FIGS. 5 through 10, may include other components, such as coalescing filters, fuel gas scrubbers, start-up heaters, etc. However, the inclusion and configuration of these elements are not critical to the operation of the invention claimed herein, and, thus, these components are not shown in the figures provided or discussed in detail.

FIGS. 5 through 8 illustrate exemplary embodiments of fuel delivery and combustion turbine engine systems according to the present application. Many of the components in the systems illustrated in FIGS. 5 through 8 are substantially the same or similar to the components described above in relation to the system of FIG. 4. Accordingly, for the sake of clarity and brevity, the numerical identifiers used in FIG. 4 also will be used in FIGS. 5 through 9 for common components.

Figure 5:
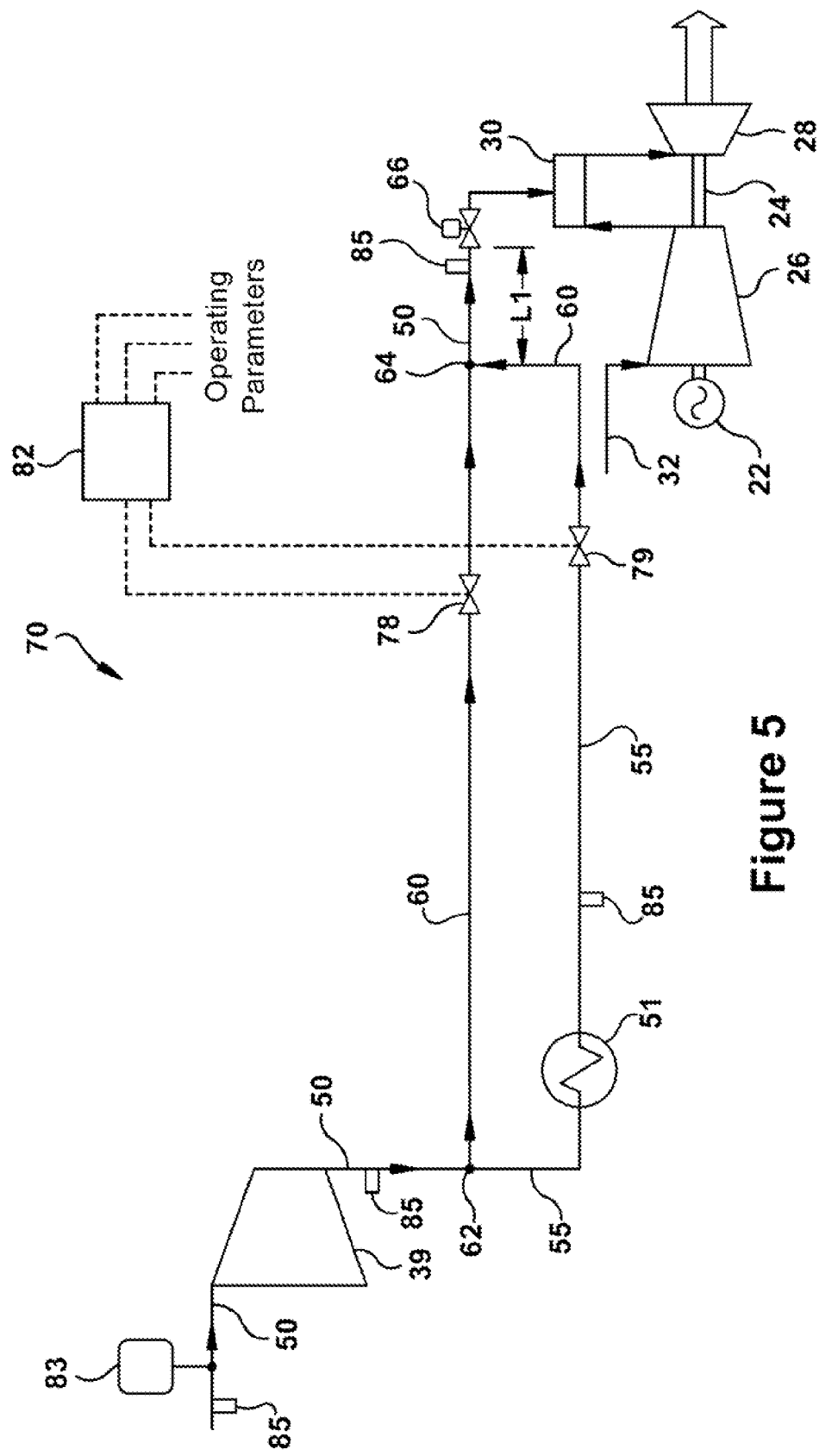
FIG. 5 is a schematic representation of a fuel delivery system of a combustion turbine engine according to an exemplary embodiment of the present application.
Figure 6:
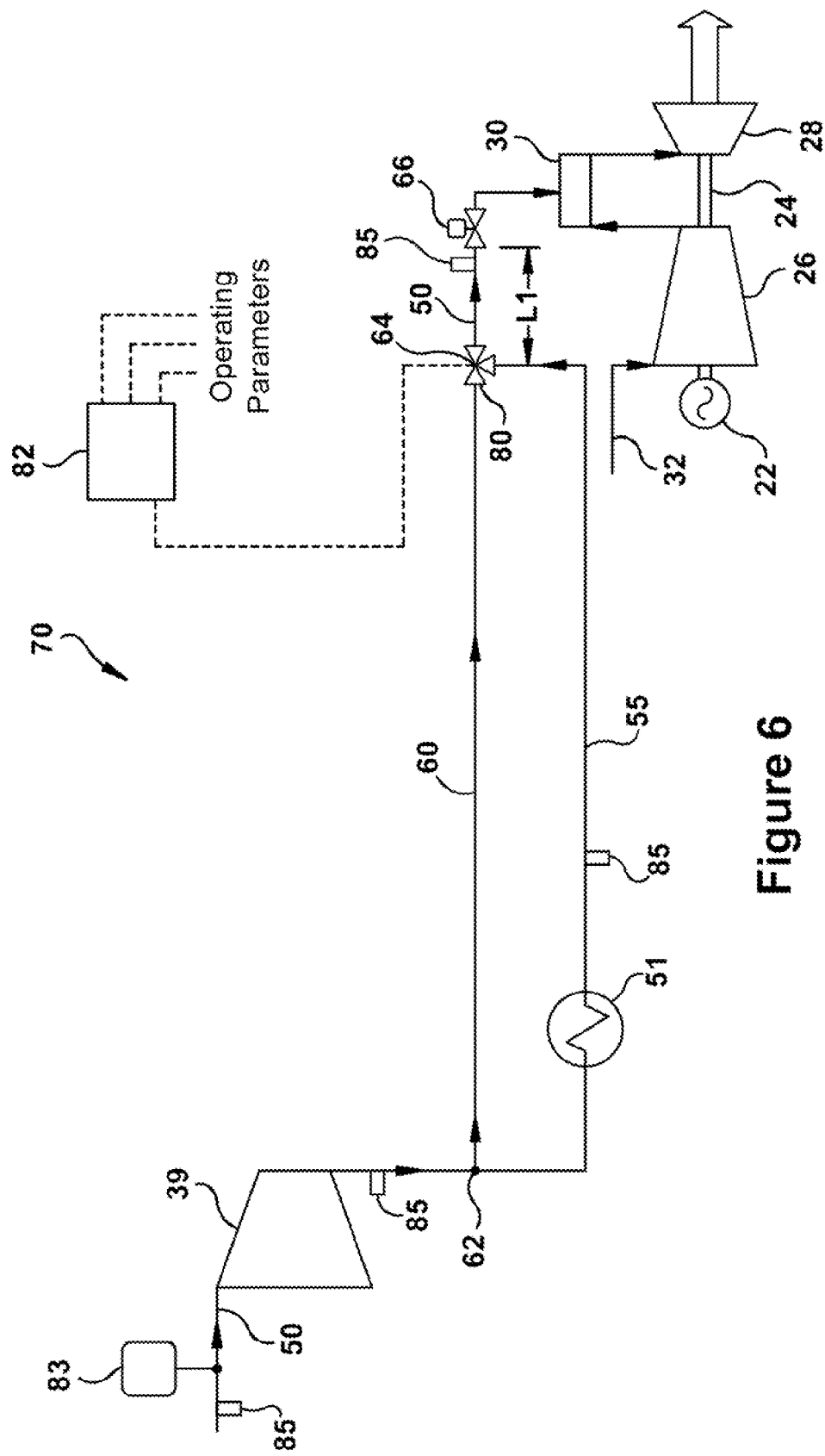
FIG. 6 is a schematic representation of a fuel delivery system of a combustion turbine engine according to an alternative embodiment of the present application.

The combustion turbine system 70 of FIGS. 5 and 6 may include, per conventional design, an electric generator 22 connected by a rotor shaft 24 to a compressor 26 and a turbine 28. A combustor 30 may be positioned between the compressor 26 and the turbine 28. An air intake line 32 may be connected to the compressor 26 such that an inlet for a supply of air is provided. A first conduit may direct the air compressed by the compressor 26 to the combustor 30, where it may be used to combust a supply of fuel. The resulting flow of hot gases may be expanded through the turbine 28, where, as described above, the energy is transformed into the mechanical energy of the rotating shaft 24. The energy of the rotating shaft then may be used to drive the compressor 26 and the generator 22, thereby producing, respectively, the supply of compressed air and electricity. This combustion turbine engine application, though, is exemplary; the current invention also may be used in other combustion turbine engine applications.

According to an exemplary embodiment of the present application, the combustion turbine system 70 is configured such that the temperature of the fuel delivered to the combustor 30 may be controlled in a timely manner by a system operator or control unit such that the fuel meets the target MWI value for the engine. As described above, combustion turbine engines generally are designed to operate using fuels having certain characteristics relating to heating value. The heating value of a fuel, which also may be referred to as the gross calorific value, gross energy or Wobbe Index rating, generally describes the amount of heat or energy released when the fuel is combusted. In combustion turbine engine applications, though, the amount of energy released by a fuel being combusted through a fuel nozzle at a given pressure ratio may be more accurately described if the temperature at which the fuel is delivered to the nozzle is taken into account. The fuel characteristic that takes into account or compensates for the temperature of the fuel is commonly referred to as the Modified Wobbe Index rating or MWI rating. As used herein, Modified Wobbe Index or MWI is intended to broadly refer to a fuel measure describing the amount of energy released by a fuel being combusted through a fuel nozzle at a given pressure ratio that takes into account or compensates for the temperature at which the fuel is delivered to the nozzle. Combustion turbine engines, therefore, are generally designed to operate with fuels that have a specific Modified Wobbe Index rating or fall within a range of acceptable Modified Wobbe Index ratings. As used herein, the specific Modified Wobbe Index rating or range of acceptable Modified Wobbe Index ratings for which a combustion turbine engine is designed are both referred to as a "target Modified Wobbe Index range" or "target MWI range". Having the capability to modify or control the temperature of the fuel being delivered to the combustor (thereby modifying or controlling the Modified Wobbe Index rating of the fuel) is a useful way to insure the engine is using fuel that is within the engine's target MWI range.

As shown in FIGS. 5 and 6, a fuel line 50 may extend from a fuel source (not shown) to the combustor 30. Through the compression process, the fuel may be heated as it is compressed in the fuel compressor 39 so that an after-cooler 51, which is positioned downstream of the fuel compressor 39, is needed so that a portion of the fuel supply that flows through the fuel compressor 39 may be cooled when needed to meet fuel temperature requirements. As before, the fuel line 50 may be described as having two parallel branches. A cold branch 55 is the branch that directs the fuel through the after-cooler 51, and a hot branch 60 is the branch that bypasses the after-cooler 51. The cold branch 55 and hot branch 60 of FIGS. 5 and 6 may be similar in certain aspects to the cold branch 55 and hot branch 60 of FIG. 4. As shown, the hot branch 60 diverges from the cold branch 55 at a point upstream of the after-cooler 51, i.e., at an upstream fork 62, and converges with the cold branch 55 at point downstream of the after-cooler 51, i.e., at a fuel-mixing junction 64. In this manner, the hot branch 60 forms an alternate or bypass route through which the supply of fuel may travel to the combustor 30 from the fuel compressor 39 without being cooled by the after-cooler 51. As a result, the fuel flowing through the hot branch 60 generally has a higher temperature than the fuel flowing through the cold branch 55.

As described in more detail below, the amount of fuel flowing through the cold branch 55 and the hot branch 60 may be controlled or manipulated by the operation of one or more conventional valves, each of which may have at least a plurality of flow settings that allow different levels of fuel flow therethrough. In some embodiments, the combustion turbine system 70 may control the flow levels between the two parallel branches via a single conventional two-way valve, which may be positioned in either the branch. As shown in FIG. 5, the combustion turbine system 70 may control the flow levels more accurately via two conventional two-way valves, a hot fuel control valve 78 positioned on the hot branch 60 and a cold fuel control valve 79 positioned on the cold branch 55. In addition, as illustrated in FIG. 6, the cold fuel control valve 79 and the hot fuel control valve 78 may be replaced with a conventional three-way valve 80. The three-way valve 80 may be located at the fuel-mixing junction 64, as shown in FIG. 6. In other embodiments, the three-way valve 80 may be located at the upstream fork 62. In addition, it will be appreciated that the system 70 may include other components, such as check-valves (not shown), that maintain the direction of flow (as indicated by the arrows on the lines) and prevent backflow.

Pursuant to conventional means and methods, the operation and settings of the relevant valves, which may include the cold fuel control valve 79 and the hot fuel control valve 78 (in the case of the embodiment of FIG. 5) or the three-way valve 80 (in the case of the embodiment of FIG. 6), may be controlled by a control unit 82. More particularly, the settings of the valves that regulate the fuel flow through the hot branch 60 and the cold branch 55 may be controlled pursuant to signals received from a control unit 82 (as indicated on the Figures by dashed lines). The control unit 82, as discussed in more detail below, may comprise an electronic or computer implemented device that includes control logic pertaining to the operation of the one or more valves. Pursuant to this control logic and/or one or more operating parameters monitored by the control unit 82 (as discussed in more detail below), the control unit 82 may send electronic signals to the one or more valves and, thereby, control the settings of the valves. In this manner, the one or more valves may be controlled, for example, to decrease flow through the hot branch 60 and increase flow through the cold branch 55, or, alternatively, increase flow through the hot branch 60 and decrease flow through the cold branch 55.

It will be appreciated that the temperature (and, thereby, the MWI rating) of the fuel supply delivered to the combustor 30 may be controlled by manipulating the percentage of the fuel supply that passes through the after-cooler 51. For example, if it is desired to decrease the temperature (thereby increasing the MWI rating) of the fuel supply delivered to the combustor, the one or more control valves (i.e., the hot fuel control valve 78, the cold fuel control valve, the three-way valve 80, or other types of valves and other valve configurations) may be controlled such that an increased percentage of the fuel supply is directed through the after-cooler 51. This will promote cooling and result in a decreased fuel temperature downstream of the fuel-mixing junction 64. Alternatively, if it is desired to increase the temperature (thereby decreasing the MWI rating) of the fuel supply delivered to the combustor, the one or more control valves may be controlled such that a decreased percentage of the fuel supply is directed through the after-cooler 51. This will result in less cooling, which will result in an increased fuel temperature downstream of the fuel-mixing junction 64.

According to an exemplary embodiment of the present invention, the combustion turbine system 70 further may include a rapid heating value meter 83. As used herein, a rapid heating value meter 83 is defined to include an instrument or device that may be used to test fuels, such as natural gas, and rapidly provide test results or data relating to the heating value of the fuel tested. Further, as used herein, providing "rapid" test results is defined as providing timely test results, or, in regard to other embodiments of the present invention, providing test results within the time periods specified herein. In some embodiments, the rapid fuel heating value meter 83 may comprise a gas calorimeter. As one of ordinary skill in the art will appreciate, a gas calorimeter is an instrument that measures the heating value of a fuel. As described above, the heating value of a fuel, which is also known as the gross calorific value, gross energy or Wobbe Index rating, is defined herein to generally describe the amount of heat or energy released when the fuel is combusted. In some embodiments, the rapid heating value meter 83 of the present invention may comprises the following devices and/or other similar devices that are configured to meet the other operational requirements described herein: a Wobbe meter, a gas calorimeter, or a heating value transmitter. As shown, in some embodiments, the rapid heating value meter 83 may be located upstream of the upstream fork 62 and upstream of the fuel compressor 39.

In some embodiments, the rapid heating value meter 83, in operation, may be configured such that it periodically samples and tests the heating value of the supply of fuel being delivered to the combustor 30. The periodic testing of the fuel supply by the rapid heating value meter 83 may occur within at least approximately every 60 seconds. In other more preferred embodiments the periodic testing of the fuel supply by the rapid heating value meter 83 may occur within at least approximately every 30 seconds. In still other more preferred embodiments, the periodic testing of the fuel supply by the rapid heating value meter 83 may occur within at least approximately every 15 seconds.

As stated, the rapid heating value meter 83 may be configured to complete the testing of the fuel and provide data concerning the heating value of the fuel within a relatively short time period. In some embodiments, the rapid heating value meter 83 comprises a device that is configured to complete the heating value testing and provide results in within at least approximately 2 minutes of taking the test sample and beginning the testing procedures. In other more preferred embodiments, the rapid heating value meter 83 may be configured to complete the heating value testing and provide results within at least approximately 1 minute of taking the test sample and beginning the testing procedures. In still other more preferred embodiments, the rapid heating value meter 83 may be configured to complete the heating value testing and provide results within at least approximately 30 seconds of taking the test sample and beginning the testing procedures. Ideally, in other embodiments, the rapid heating value meter 83 may be configured to complete the heating value testing and provide results within at least approximately 10 seconds of taking the test sample and beginning the testing procedures.

The rapid heating value meter 83 and the control unit 82 generally may be configured to communicate electronically to the other, though this is not depicted in the Figures. More particularly, the rapid heating value meter 83 may send data relating to the testing of the heating value of the fuel supply to the control unit 82 per conventional means and methods.

The combustion turbine system 70 further may include conventional instruments to measure the temperature of the fuel supply at one or more locations within the fuel delivery system. For example, at the location of the rapid heating value meter 83, a first thermocouple or other temperature measuring device 85 may be positioned or integrated into the rapid heating value meter 83 such that the temperature of the fuel supply may be measured at the same time that the heating value is determined and communicated to the control unit 82. At this location, the temperature measurement may provide what will be referred to herein as a "raw fuel temperature", i.e., the temperature of the raw fuel supply before it is heated or compressed. A second temperature measuring device 85 may be located between the outlet of the fuel-compressor 39 and the upstream fork 62 or along the hot branch 60 between the upstream fork 62 and the fuel-mixing junction 64. This temperature measurement provides what will be referred to herein as a "compressed fuel temperature", i.e., the temperature of the fuel after it has been compressed and heated by the fuel compressor 39. A third temperature measuring device may be located between the outlet of the after-cooler 51 and the fuel-mixing junction 64. This temperature measurement provides what will be referred to herein as a "cooled fuel temperature", i.e., the temperature of the fuel after it has been cooled by the after-cooler 51. A fourth temperature measuring device 85 may be located downstream of the fuel-mixing junction 64. This temperature measuring device 85, for example, may be positioned at the inlet of the combustor 30 or at the inlet of the combustor gas control valve 66. A temperature measurement at this location provides what will be referred to herein as a "mixed fuel temperature", i.e., the temperature of the fuel generally downstream of the fuel-mixing junction 64 and/or at the inlet of the combustor 30. The temperature measuring devices 85 may communicate measured temperature data to the control unit 82 per conventional means and methods. In addition, relating to embodiments described below in relation to FIGS. 7 and 8, a fifth temperature measuring 85 device may be located downstream of a secondary heat source, such as a bath heater. This temperature measuring device 85, for example, may be positioned at the outlet of the heat source along what may be referred to as a hot compressor bypass. This temperature measurement provides what will be referred to herein as a "heated fuel temperature", i.e., the temperature of the fuel generally downstream of the secondary heat source and upstream of the fuel-mixing junction 64. The instruments for measuring temperature may communicate measured temperature data to the control unit 82 per conventional means and methods.

As stated, in conventional systems, the distance of conduit or fuel line 50 between the fuel-mixing junction 64 and the combustor gas control valve 66 or the inlet of the combustor 30 is relatively lengthy. (Note that the "combustor gas control valve 66" is meant to refer to the control valves that occur just upstream and in close proximity to the combustor 30 and, thus, is used substantially interchangeably herein with the "inlet of the combustor 30" to describe the approximate location where the supply of fuel is introduced to the combustor 30. Specifically, as intended herein, reference to the "combustor gas control valve 66" is substantially the same as reference to the inlet of the combustor 30. Therefore, in a system that for whatever reason has no control valves just upstream or in close proximity to the combustor 30, reference herein to the "combustor gas control valve 66" is meant to refer instead to the inlet of the combustor 30.) It will be appreciated that the distance between the fuel-mixing junction 64 and the combustor gas control valve 66, when lengthy, makes it more difficult to rapidly change the temperature of the fuel supply being delivered to the combustor 30, as an extended length of conduit generally forms a heat sink that works against rapid temperature changes and/or an extended length of conduit must be substantially flushed before a significant change in the fuel temperature (and, thus, before a significant change in the MWI rating of the fuel) is felt at the combustor gas control valve 66 or the inlet of the combustor 30. As a result, in conventional systems, there is a significant delay between the actions taken to change fuel temperature and when the resulting change is felt at the combustor gas control valve 66 or the inlet of the combustor 30.

Further, in conventional combustion turbine systems, this delay in the ability to change the temperature of the fuel supply generally is exacerbated by the typical delay associated with obtaining heating value data for the fuel supply from a gas chromatograph or other similar device being used for this purpose. As a result, a conventional combustion turbine system may experience a delay detecting a change in the heating value of the fuel supply, which then may be compounded by a second delay that is generally occasioned in bringing about a change in the temperature of the fuel being supplied at the combustor 30. As described in more detail below, combustion turbine systems that are configured to operate according to exemplary embodiments of the present invention reduce or substantially eliminate these delay issues through the use of a rapid heating value meter 83, which may be configured to provide more timely and rapid fuel supply heating value data to the control unit 82.

Further, exemplary embodiments of the present invention provide a bypass fuel line, which allows fuel to bypass the after-cooler 51, such that fuel temperature changes (and the resulting changes in the MWI rating of the fuel) may be felt at the inlet of the combustor 30 more rapidly. In some embodiments of the present invention, this result may be achieved by positioning the fuel-mixing junction 64 (i.e., the location at which a supply of unheated fuel and heated fuel is mixed to a desired temperature) such that the length of conduit between the fuel-mixing junction 64 and the combustor gas control valve 66 is reduced. As stated, by reducing this length of conduit, the mixing of the heated fuel and the unheated fuel may occur in close proximity to the combustor gas control valve 66, which generally allows temperature changes to the fuel reaching the combustor 30 to occur in a relatively quick manner.

It has also been discovered that, in some cases, a minimum distance should remain between the location where the heated and unheated fuel is mixed and the combustor gas control valve 66. This minimum distance allows for the heated and cooled fuel to mix sufficiently such that a relatively uniform fuel temperature through the fuel supply is obtained before the fuel is delivered to and combusted within the combustor 30. It will be appreciated that having a relatively uniform fuel temperature through the fuel supply promotes better engine performance, particularly for the operation of the combustor 30. Given these competing considerations, as part of the invention described herein, preferred ranges of conduit length had been developed. Thus, in some preferred embodiments, the fuel-mixing junction 64 may be positioned such that the length of conduit between the fuel-mixing junction 64 and the combustor gas control valve 66 (or the inlet of the combustor 30) is between approximately 2 and 20 meters. More preferably, the fuel-mixing junction 64 may be positioned such that the length of conduit between the fuel-mixing junction 64 and the combustor gas control valve 66 (or the inlet of the combustor 30) is between approximately 4 and 15 meters. And, ideally, the fuel-mixing junction 64 may be positioned such that the length of conduit between the fuel-mixing junction 64 and the combustor gas control valve 66 (or the inlet of the combustor 30) is between approximately 6 and 10 meters. Each of these ranges provides enhanced performance. As stated, with the shorter span of conduit between the location where fuel supply temperature is controlled and the approximate inlet of the combustor, temperature changes (and, thus, changes in the MWI rating of the fuel) may be made more rapidly (i.e., less flushing or purging is required and the conduit acting as a heat sink is reduced). And, the maintenance of a minimal conduit distance provides that adequate mixing of the two fuel supplies is achieved.

A person of ordinary skill in the art will appreciate that a system consistent with one or more of the aspects described above in relation to FIGS. 5 and 6 may be used to effectively and timely control the temperature of the fuel delivered to the combustor so efficient engine operation is promoted. A flow diagram illustrating an exemplary method of operation is presented below in relation to FIGS. 9 and 10.

Figure 7:
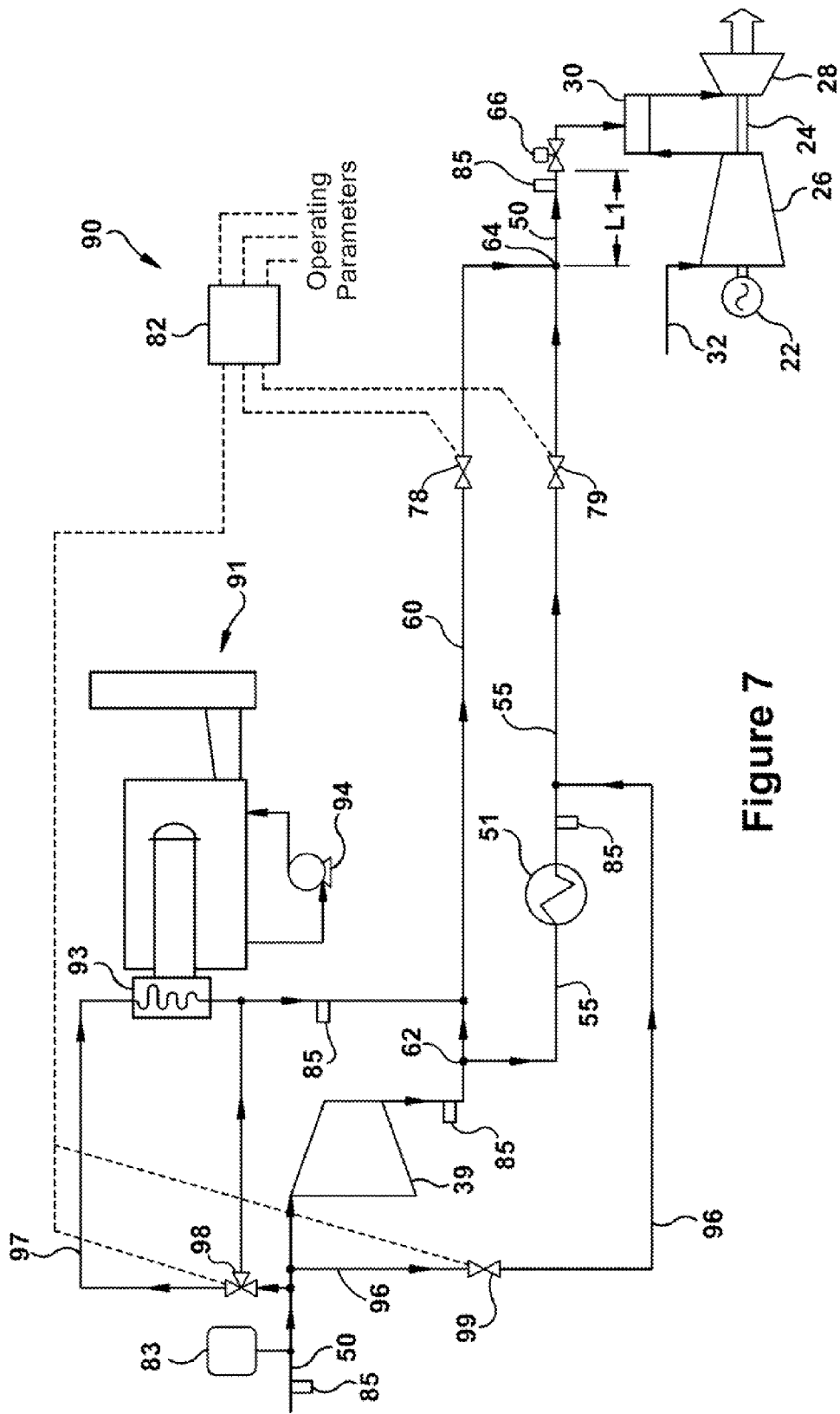
FIG. 7 is a schematic representation of a fuel delivery system of a combustion turbine engine according to an alternative embodiment of the present application.
Figure 8:
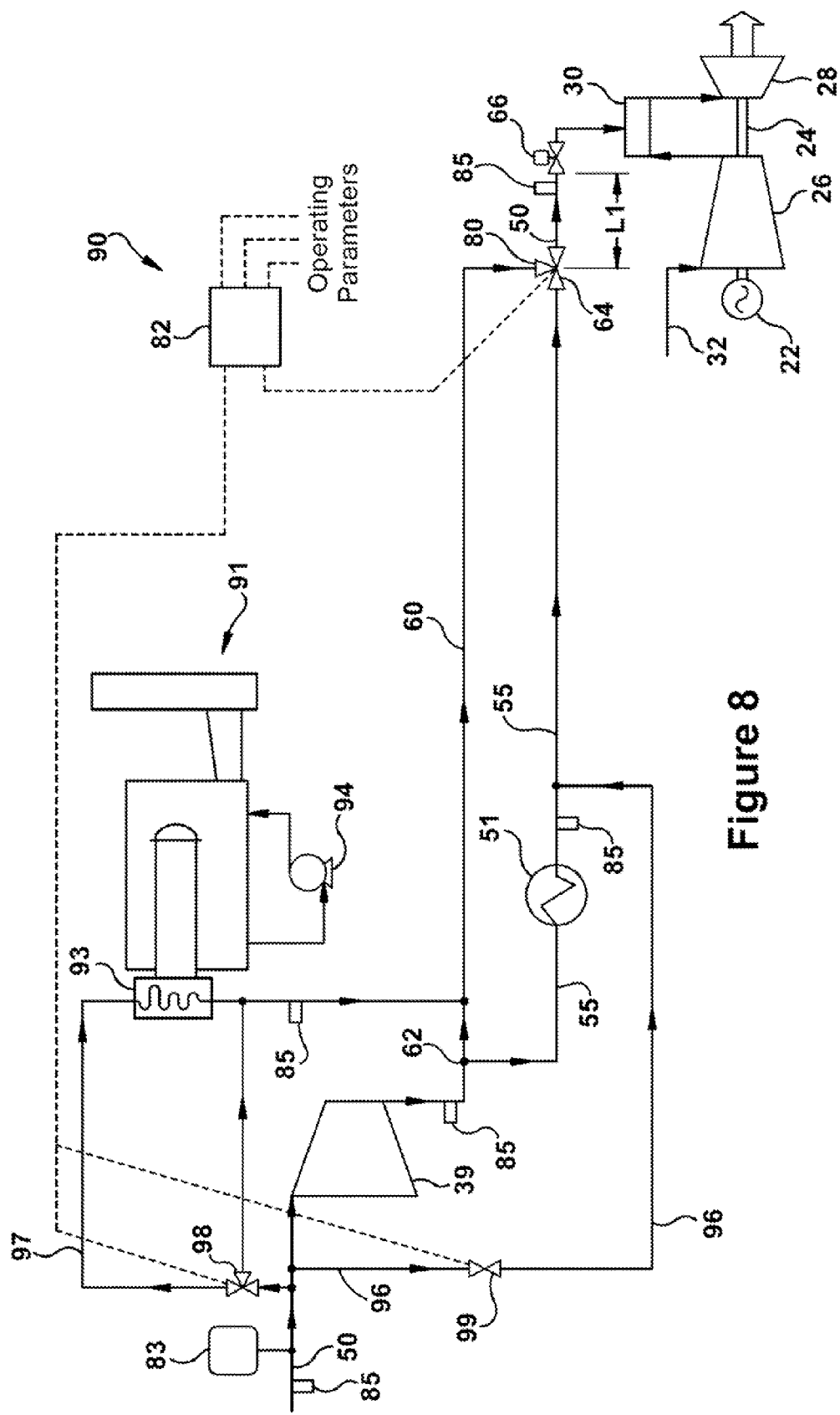
FIG. 8 is a schematic representation of a fuel delivery system of a combustion turbine engine according to an alternative embodiment of the present application.

In one typical application, the embodiment of FIGS. 5 and 6 may be employed when the supply of fuel requires the constant use of a fuel compressor to meet fuel pressure requirements of the combustor. As one of ordinary skill in the art will appreciate, in some instances, because the fuel supply is at times already adequately pressurized, many combustion turbine systems do not require constant fuel compression. Systems of this type generally require only intermittent operation of a fuel compressor to boost supply pressures, which, of course, means the heat provided by the compression of the fuel is only available intermittently. FIGS. 7 and 8 illustrate aspects of a turbine system configuration according to an exemplary embodiment of the present invention. It will be appreciated that systems according to FIGS. 7 and 8 may be used effectively in turbine systems that require only intermittent use of a fuel compressor.

FIG. 7 illustrates a combustion turbine system 90 that includes an alternative heat source for providing heat to the supply of fuel. The alternative heat source, as described in detail below, may be used to heat a flow of fuel to a desired temperature level when the fuel compressor is off-line. As shown, the alternative heat source of the turbine system 90 may be a bath heater 91. It will be appreciated that other heat sources may also be used and that the bath heater 91 is provided merely as a preferred embodiment. In other embodiments, for example, the alternative heat source may be a direct fired heater, an electric heater, a heat pipe heat exchanger, a steam heater, a hot-water heater, or a heat exchanger that uses heat from the exhaust of the combustion engine, as well as other types of conventional heat sources. As one of ordinary skill in the art will appreciate, the bath heater 91 generally includes a heat transfer fluid, which may be water or, for more elevated temperatures, thermal oil, that is heated and used in a heat exchanger 93 to heat the fuel that passes therethrough. The bath heater 91 includes a pump 94 that circulates the heat transfer fluid between a heater and the heat exchanger 93. Though not shown, the supply of fuel for the bath heater 91 may be bled from the fuel line 50. One of the advantages of using the bath heater 91 is that it may heat fuel without using heat from the turbine engine, which may be advantageous during engine startup when heat from the turbine engine is substantially unavailable.

The turbine system 90, as shown in FIG. 7, may have a fuel line 50 that extends from a fuel source (not shown) to the combustor 30. As before, the fuel line 50 has parallel branches. In this instance, pursuant to an exemplary embodiment, the fuel line 50 may be described as having a cold branch 55, a hot branch 60, as well as two branches that bypass the fuel compressor 39: a cold compressor bypass 96 and a hot compressor bypass 97. As before, the cold branch 55 is the branch that directs the fuel from the fuel compressor 39 through the after-cooler 51 and the hot branch 60 is the branch by which the flow of fuel from the fuel compressor 39 bypasses the after-cooler 51. The cold compressor bypass 96, as shown, is a branch that takes a flow of fuel from a point on the fuel line 50 upstream of the fuel compressor 39 and delivers it to a point on the cold branch 55, which, as shown, is preferably downstream of the after-cooler 51. It will be appreciated that the cold compressor bypass 96 bypasses the fuel compressor 39 and the alternative heat source, in this case the heat exchanger 93 of the bath heater 91, such that the fuel remains unheated. The hot compressor bypass 97 is a branch that directs a flow of fuel that is taken from a point upstream of the fuel compressor 39 and directs the flow through the heat exchanger 93 of the alternative heat source and, then, delivers the heated flow to the a point on the hot branch 60. When discussing the four fuel flows in FIGS. 7 and 8 (i.e., the fuel flows through the cold branch 55, the hot branch 60, the cold compressor bypass 96, and the hot compressor bypass 97), it will be appreciated that the flows may converge or diverge in configurations that are different than shown and that other valve configurations may be used to control the mixing of the different flows at the fuel-mixing junction 64. For example, for controlling the mixing of the fuel flows, FIG. 7 shows a hot fuel control valve 78 and a cold fuel control valve 79 on the hot branch 60 and the cold branch 55, respectively, while FIG. 8 shows a three-way valve 80 at the fuel-mixing junction 64. It should also be understood that reference herein to the "fuel-mixing junction" should take into account any arrangement where a relatively "hot" flow of fuel is mixed with a relatively "cold" one. In all embodiments, it will be appreciated that the fuel-mixing junction 64 will be located at a position in proximity to the combustor 30 and include the convergence of at least two fuel flows having differing temperatures.

The combustion turbine system 90 may have a rapid heating value meter 83, as shown, which functions as described above. The system 90 also may have temperature measuring devices 85 in the locations shown, and these devices may function similarly as those described above in relation to FIGS. 5 and 6. The system 90 may have an additional temperature measuring device 85 that measures the temperature of the fuel after the fuel passes through the heat exchanger 93. This temperature measurement provides what will be referred to herein as a "heated fuel temperature", i.e., the temperature of the fuel after it has been heated by the bath heater 91 or other alternative or secondary heat source.

The system 90 may operate when the fuel compressor 39 is needed to boost the pressure of the fuel; and, given the alternative heat source 91, the system 90 may also operate when the fuel compressor 39 is not in use. It will be appreciated that when the fuel compressor 39 is operating, the system 90 may operate in much the same way as described above in relation to the embodiments of FIGS. 5 and 6, as those embodiments were applicable a system in which the fuel compressor 39 provides heat to the fuel supply through the process of compression. When the fuel compressor 39 is offline, the system 90 may operate in a different manner by using the alternative heat source (i.e., the bath heater 91) that is available to it. The description of operation here will focus on this other type of operation, which, as one of ordinary skill will appreciate, provides flexibility and performance advantages for certain applications.

When the fuel compressor 39 is operating, the hot compressor bypass 97 is closed so that no fuel flows therethrough. It will be appreciated that the hot compressor bypass 97 is used to direct a flow of fuel that bypasses the compressor 39 through the heat exchanger 93. If the fuel compressor 39 is in operation, the fuel likely lacks sufficient pressure to meet combustor supply requirements and, thus, the branch 97 must be closed so that all of the fuel is directed through the fuel compressor 39 where the pressure boost is provided. The closing of the hot compressor bypass 97 may be done via the use of a three-way valve 98 positioned as shown in FIGS. 7 and 8. Likewise, because the cold compressor bypass 96 also allows fuel to bypass the fuel compressor 39, the cold compressor bypass 96 generally is closed in this type of operation as well. The cold compressor bypass 96 may be closed by two-way valve 99, as shown. Other valve configurations are possible.

In this mode, the operation and configuration of the components shown in FIGS. 7 and 8 generally is similar or the same as that described in relation to those components as provided above for FIGS. 5 and 6. These components include the fuel compressor 39, after-cooler 51, cold branch 55, hot branch 60, fuel-mixing junction 64 (and the location thereof), the control unit 82, the rapid heating value meter 83, and the various valves for flow control.

The system 90 provides the operational flexibility to supply heated fuel at a desired temperature when the fuel compressor 39 is operating and when the fuel compressor 39 is inactive because the system 90 has an alternative heat source 91 that may be used to heat the fuel when the fuel compressor 39 is unavailable to do this (i.e., when the fuel compressor 39 is not needed to boost the pressure of the fuel). It will be appreciated that when the fuel compressor 39 is inactive, the flows from the compressor 39 through the cold branch 55 and hot branch 60 are not present, and the after-cooler 51 is inactive. The operation and configuration of the other components that are active when the fuel compressor 39 is off-line is generally similar or the same as that provided above in description related to these components, which generally include the fuel-mixing junction 64 (and the location thereof), the control unit 82, the rapid heating value meter 83, and the control of various valves.

It will be appreciated that with the flow from the fuel compressor 39 through the cold branch 55 and the hot branch 60 being absent, the system 90 essentially reduces to two parallel flows: 1) a flow of uncompressed fuel through the hot compressor bypass 97, which is heated via the alternative heat source (i.e., the bath heater 91); and 2) a flow of unheated and uncompressed fuel through that cold compressor bypass 96. These two flows may be brought together at the fuel-mixing junction 64 and, per the systems and methods described herein in relation to the several embodiments of the present invention (which, for example, may include the nearby location of the fuel-mixing junction 64 to the inlet of the combustor 30 and the rapid heating value meter 83) mixed in a way such that the resulting temperature provides the combustor with a fuel within a preferred MWI range.

As stated, the control unit 82 may have programmed logic that monitors one or more operational parameters and that may control the function of the one or more valves such that, in accordance with exemplary embodiments of the present invention, the fuel supply is delivered to the combustor at a preferred MWI rating or within preferred range of MWI ratings, which will be referred to here as a target MWI range. As one of ordinary skill in the art will appreciate, algorithms, control programs, logic flow diagrams, and/or software programs, as described in detail below, may be developed to monitor changing operational parameters of a combustion turbine engine system so that, by controlling the temperature at which the fuel is delivered to the combustor, the MWI rating of the fuel supply to the combustor falls within the target MWI range. As one of ordinary skill in the art will appreciate, such a system may include multiple sensors and instruments, as discussed above, that monitor the relevant turbine engine operational parameters. These hardware devices and instruments may send data and information to and be controlled and manipulated by a conventional computer-implemented control system, such as control unit 82. That is, pursuant to conventional means and methods, a control system, such as control unit 82, may receive and/or acquire data from the combustion turbine system 70, process the data, communicate with the operators of the combustion turbine system, and/or control the various mechanical devices of the system pursuant to a set of instructions or logic flow diagram, which, as one of ordinary skill in the art will appreciate, may be made part of a software program that is operated by control unit 82, and which comprises an embodiment of the present invention.

Figure 10:
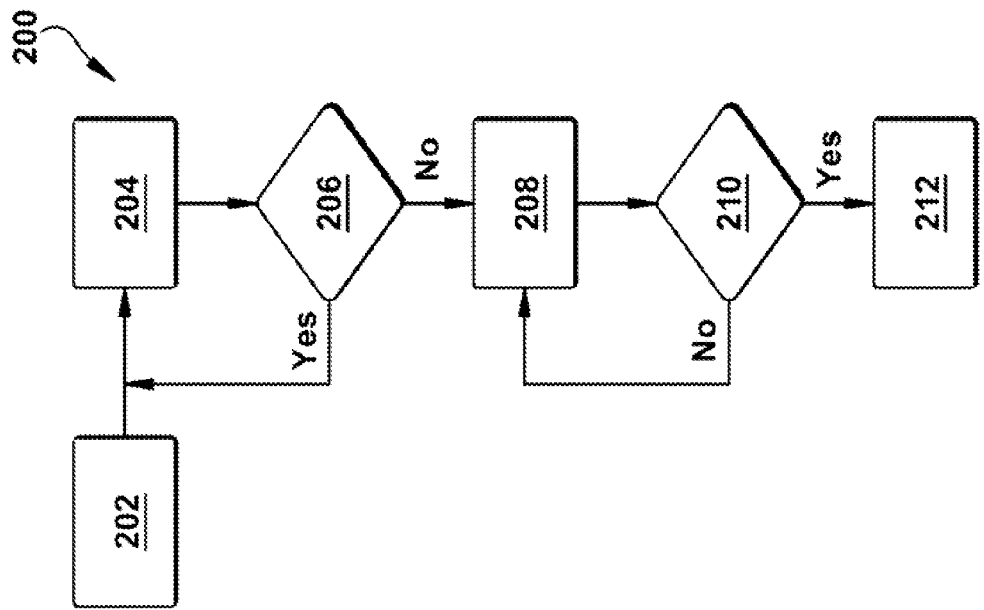
FIG. 10 is a flow diagram illustrating the operation of an alternative embodiment of the present application.
Figure 9:
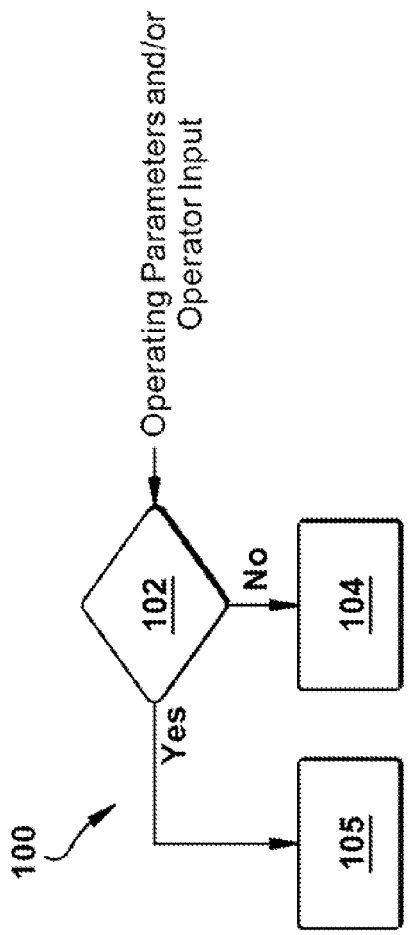
FIG. 9 is a flow diagram illustrating the operation of an exemplary embodiment of the present application.

FIGS. 9 and 10 illustrate logic flow diagrams according to embodiments of the present application. FIG. 9 provides a top-level diagram representing how the mode of operation may be selected, i.e., whether the fuel compressor 39 is necessary to boost supply pressures and whether the secondary heat source is necessary to provide heat to the fuel system. In the exemplary embodiments of FIGS. 5 and 6, it will be appreciated that because the fuel compressor 39 always operates and there is no secondary heat source, the top-level logic flow diagram would not be needed. FIG. 10 illustrates an example of how the different modes of operation may function. It will be appreciated that embodiments according to the present application may include one or more or all of the several modes of operation, any part there of, or any other combination as described by the appended claims.

FIG. 9 illustrates a logic flow diagram 100. As one of ordinary skill in the art will appreciate, the logic flow diagrams of FIGS. 9 and 10 may be implemented and performed by the control unit 82. In some embodiments, the control unit 82 may comprise any appropriate high-powered solid-state switching device. The control unit 82 may be a computer; however, this is merely exemplary of an appropriate high-powered control system, which is within the scope of the application. The control unit 82 also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the control unit also may be implemented using a variety of separate dedicated or programmable integrated or other electronic circuits or devices, such as hardwired electronic or logic circuits including discrete element circuits or programmable logic devices, such as PLDs, PALs, PLAs or the like. The control unit 82 also may be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the logic flow diagrams of FIGS. 10 and 11 may be used as the control unit 82.

Logic flow diagram 100 may begin at a step or block 102, where it may be determined if the supply of fuel to the system requires a pressure boost by the fuel compressor 39. (As stated, the system embodiments of FIGS. 5 and 6 are configured such that the fuel compressor 39 always functions so that this inquiry would not be necessary.) The determination as to whether the fuel compressor 39 is needed generally is made given a conventional pressure reading associated with the incoming fuel supply. If it is determined that "no" a pressure boost is not required, the method may continue to step 104. If it is determined that "yes" a pressure boost is required, the method may continue to step 105.

At step 104, because a pressure boost to the fuel supply is not required, the process generally discontinues the operation of the fuel compressor 39 and configures the system valves 99 so that the fuel supply bypasses the fuel compressor 39. More particularly, at a point on the fuel line 50 upstream of the fuel compressor 39, the fuel supply is routed through the cold compressor bypass 96 and the hot compressor bypass 97 and the passageway to the fuel compressor 39 is closed per conventional means or apparatus (not shown). The flow diagram of FIG. 10 describes on method in which the two flows through the cold compressor bypass 96 and the hot compressor bypass 97 may be mixed at the fuel-mixing junction 64 such that the resulting fuel temperature provides the combustor 30 with fuel of a target MWI range.

At step 105, because the process determined that a pressure boost to the fuel supply is needed, the process may initiate or continue the operation of the fuel compressor 39 and configure the system control valves so that substantially all of the fuel supply is directed through the fuel compressor 39. More particularly, control valves may be configured to close the cold compressor bypass 96 and the hot compressor bypass 97 and open the conduit to the fuel compressor 39. The process also may configures the control valves so that the fuel supply exiting the fuel compressor 39 is directed through the cold branch 55 and the hot branch 60 in a desired manner. The flow diagram of FIG. 10 describes how these two flows (i.e., the flows from the cold branch 55 and the hot branch 60) may be mixed at the fuel-mixing junction 64 such that the resulting fuel temperature provides the combustor 30 with fuel of a target MWI range.

Referring now to FIG. 10, an exemplary mode of operation in which two or more fuel flows of different temperatures may be brought together and mixed in a desired manner so that the MWI rating of the fuel entering the combustor 30 is within a target range. At step 202, the control unit 82, pursuant to any of the methods discussed above, may receive, monitor, and record data relating to the operational parameters of the combustion turbine system 70, 90, and, particularly, the fuel delivery system of the combustion turbine system 70, 90. As described, the operational parameters may include one or more of the following: a heating value of the fuel supply (which, for example, may be measured via the rapid heating value meter 83); the temperatures of the fuel supply at various locations within the fuel delivery system (which, for example, may include an raw fuel temperature measurement, a heated fuel temperature measurement, a compressed fuel temperature measurement, a cooled fuel temperature measurement, and a mixed fuel temperature measurement, as discussed above); and/or measurements relating to the flow rates through the cold branch 55, the hot branch 60; the cold compressor bypass 96; and the hot compressor bypass 97 (which, for example, may include the setting of any of the valves that control the flow through these conduits, and may also include fuel pressure measurements taken within any of these conduits, which may be achieved via a conventional pressure transducer positioned therein). From step 202, the process may continue to step 204. It will be appreciated that the measuring, monitoring, and/or recording of operational parameters may occur continuously or at regular intervals and updated so that current data may be used throughout any of the several steps of logic flow diagram 200 whether or not there is a direct line in FIG. 10 connecting step 202 to the other step.

At step 204, given the current measurement of the heating value of the fuel supply, the process may determine an acceptable temperature or temperature range at which the fuel supply should be delivered to the combustor 30 to satisfy a target MWI range. As described, combustion turbine engines generally are designed to operate with a fuel that has a certain heating value or heating value range. More particularly, engines may be designed for a target MWI range. In practice, the heating value of an engine's fuel supply generally varies. By changing the temperature of a fuel, the varying levels of heating value may be compensated for so that the target MWI range is satisfied. Specifically, the MWI rating of the fuel supply may be adjusted by raising or lowering the temperature of the fuel supply such that the fuel delivered to the combustor of the engine is at the prescribed or preferred MWI rating or within the range of prescribed or preferred MWI ratings for which the engine was designed. As stated, the prescribed or preferred MWI rating or the range of prescribed or preferred MWI ratings for the fuel for which an engine is designed are both referred to herein as the target MWI range. As one of ordinary skill in the art will appreciate, combustion turbine engines perform better, including more efficiently and reliably, when fuel is delivered to the combustor at an MWI rating that coincides with the target MWI range. Delivering fuel to the combustor outside of the target MWI range (i.e., which, may occur is the temperature of the fuel being delivered to the combustor does not produce a MWI rating within the target MWI range) may cause engine performance and efficiency losses and/or may damage turbine components.

Also, as stated above, delivering fuel to the combustor 30 outside of the proper range may lead to a gas turbine "runback" situation, which may be highly undesirable because it generally results in the engine automatically taking the precautionary step of significantly reducing engine output. While this preventative action is done to minimize potential damage that might occur when the MWI rating of the fuel does not fall within the recommended range, the sudden loss of output may cause other issues that are highly undesirable as well.

The relationship between the MWI rating of a fuel and temperature of the fuel is an inverse one. That is, as the temperature of the fuel is increased, the MWI rating decreases. Alternatively, as the temperature of the fuel is decreased, the MWI rating increases. Thus, for example, assume that a fuel has a heating value of "X" and, given the target MWI range for which the turbine engine was designed, the range of acceptable temperatures at which this fuel may be delivered to maintain a MWI rating within the target MWI range constitutes a temperature range of between "Z" and "Y". If the heating value of the fuel supply increases to a value of (X+10), then, generally, the range of acceptable temperatures at which the fuel may be delivered to the combustor to maintain a MWI rating within the target MWI range generally decreases to a range of temperatures, for example, between (Z−20) and (Y−20). Accordingly, a combustion turbine engine generally has an accepted or recommended temperature and/or range of temperatures at which a fuel should be delivered to the combustor given the heating value of the fuel (i.e., a range of temperatures that maintains a MWI rating within the target MWI range). At step 204, this preferred temperature or recommended temperature range, which will hereafter be referred to as a "target temperature range", is determined. In sum, the target temperature range is the temperature value or range that, based on the heating value measurement taken by the rapid fuel heating value meter 83, maintains the MWI rating of the fuel as it is delivered to the combustor within the target MWI rating. From step 204, the process may then continue to step 206.

At step 206, given the temperature of the mixed fuel temperature measured between the fuel-mixing junction 64 and the inlet of the combustor 30 (as measured and monitored as part of the continuing operation of step 202), the process may determine the following: is the mixed fuel temperature within the target temperature range calculated at step 204? If it is determined that the temperature of the fuel supply at the inlet of the combustor is at or within the target temperature range, the process may return to step 204, as shown. If it is determined that the temperature of the fuel supply at the inlet of the combustor is not at or within the target temperature range, the process may continue to step 208.

At step 208, the control unit may manipulate the settings of the various system valves 99 so that the mixed fuel temperature is modified in a way so to bring it closer to or within the target temperature range. Accordingly, if it was determined that the mixed fuel temperature needs reducing (i.e., if the measured mixed fuel temperature is higher than the target temperature range), the settings for several control valves may be modified so that the reapportioned flow through the active branches reduces the mixed fuel temperature. This, as discussed above, may be achieved in several ways depending on how the system is functioning. For example, in the system 70 of FIGS. 5 and 6, more fuel may be directed through the cold branch 55 and less through the hot branch 60 so that more of the fuel mixed at the fuel-mixing junction 64 has been cooled by the after-cooler 51. It will be appreciated that this same method of temperature reduction also may utilized in the system 90 of FIGS. 7 and 8 when the fuel compressor 39 is operating and the secondary heat source is inactive. On the other hand, when the fuel compressor 39 is not operating in system 90, the fuel flow through the system may be reapportioned such that more is directed through the cold compressor bypass 96 and less through the hot compressor bypass 97 so that less of the fuel mixed at the fuel-mixing junction 64 has been heated.

Alternatively, if it was determined that the mixed fuel temperature needs increasing (i.e., if the measured mixed fuel temperature is lower than the target temperature range), the settings for several system control valves may be modified so that the reapportioned flow through the active branches increases the mixed fuel temperature. This, as discussed above, may be achieved in several ways depending on how the system is functioning. For example, in the system 70 of FIGS. 5 and 6, less fuel may be directed through the cold branch 55 and more through the hot branch 60 so that less of the fuel mixed at the fuel-mixing junction 64 has been cooled by the after-cooler 51. It will be appreciated that this same method of increasing the temperature also may be utilized in the system 90 of FIGS. 7 through 9 when the fuel compressor 39 is operating and the secondary heat source is inactive. On the other hand, when the fuel compressor 39 is not operating in system 90, then the flow may be reapportioned such that less is directed through the cold compressor bypass 96 and more through the hot compressor bypass 97 so that more of the fuel mixed at the fuel-mixing junction 64 has been heated.

At step 210, given modified mixed fuel temperature that resulted from the action taken at step 208, the process may determine the following: is the temperature of the mixed fuel temperature within the target temperature range calculated at step 204? If it is determined that the mixed fuel temperature (which, it will be appreciated, may be measured at the inlet to the combustor 30) is within the target temperature range (thereby producing fuel within the target MWI range), the process may proceed to step 212. If however, it is determined that the mixed fuel temperature is still not within the target temperature range (thereby failing to produce fuel within the target MWI range), the process may return to step 208 where the system control valves may be adjusted another time. It will be appreciated that the process may repeat the control loop between steps 208 and 210 until the temperature of the fuel being delivered to the combustor is at or within the target temperature range. At step 212, the process may end. Alternatively, (not shown) the process may return to step 202 to begin again.

The example process elements of FIGS. 9 and 10 are shown by way of example. It will be appreciated that other processes and flow diagram embodiments can have fewer or greater numbers of elements or steps, and such elements or steps can be arranged in alternative configurations in accordance with other embodiments of the invention. As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each possible iteration is not herein discussed in detail, though all combinations and possible embodiments embraced by the several claims below are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method of controlling the delivery of fuel to a combustor of a combustion turbine engine, wherein a fuel delivery system of the combustion turbine engine includes: a fuel line having a fuel compressor positioned between a first connection to a fuel source and a second connection to the combustor of the combustion turbine engine, wherein the fuel line further comprises parallel branches downstream of the fuel compressor: a cold branch that includes an after-cooler; and a hot branch that bypasses the after-cooler; a rapid heating value meter configured to measure the heating value of the fuel from the fuel source and transmit heating value data relating to the measurements; wherein the rapid heating value meter comprises a device that provides heating value test results in less than approximately 30 seconds of beginning the testing process; and wherein the fuel delivery system is configured to test the fuel at regular intervals, the regular intervals being less than approximately 30 seconds; means for controlling the amount of fuel being directed through the cold branch and the amount of fuel being directed through the hot branch; and a fuel-mixing junction positioned in close proximity to the a combustor gas control valve at which the cold branch and the hot branch converge; the method including the steps of:
measuring the heating value of the fuel with the rapid heating value meter;
determining a target temperature range for the fuel based on the measured heating value and a target Modified Wobbe Index range of the combustor; and
controlling the flow of fuel through the cold branch and the hot branch such that the temperature of the fuel being delivered to the combustor comprises a temperature within the target temperature range;
wherein the fuel line further comprises a hot compressor bypass, which connects to the fuel line at a position upstream of the fuel compressor and is configured such that a flow of fuel therethrough bypasses the fuel compressor and is carried to a heater and heated, and from the heater, the hot compressor bypass connects to the hot branch at a position upstream of the fuel-mixing junction; and wherein the fuel line further comprises a cold compressor bypass, which connects to the fuel line at a position upstream of the fuel compressor and is configured such that a flow of fuel therethrough bypasses the fuel compressor and the heater and connects to the cold branch at a position upstream of the fuel-mixing junction and downstream of the after-cooler; and
wherein the fuel delivery system further comprises a plurality of temperature measuring devices that are configured to measure fuel temperature, the plurality of temperature measuring devices being disposed along the fuel line at several locations to measure at least: a compressed fuel temperature that comprises the temperature of the fuel after being compressed by the fuel compressor; a cooled fuel temperature that comprises the temperature of the fuel after being cooled by the after-cooler; a heated fuel temperature that comprises the temperature of the fuel after being heated by the heater; a raw fuel temperature that comprises the temperature of the fuel in the cold compressor bypass; and a mixed fuel temperature that comprises the temperature of the fuel downstream of the fuel-mixing junction;
further comprising the steps of:
periodically measuring the compressed fuel temperature, the cooled fuel temperature, the heated fuel temperature, the raw fuel temperature, and the mixed fuel temperature; and
based on the heating value measurement and the temperature measurements, controlling the flow of fuel such that a desired portion of the fuel is directed through the cold branch, a desired portion of the fuel is directed through the hot branch, a desired portion of fuel is directed through the hot compressor bypass, and a desired portion of fuel is directed through the cold compressor bypass so that the mixed fuel temperature downstream of the fuel-mixing junction achieves the target temperature range.

2. The method according to claim 1, wherein the fuel delivery system is configured to be selectively operable between at least two modes of operation including: a) a first mode of operation wherein the fuel compressor operates to compress the flow of fuel to the combustor; and b) a second mode of operation wherein the fuel compressor is inactive;
further comprising the steps of:
if operating in the first mode of operation, controlling the fuel flow such that substantially all the fuel is directed through the fuel compressor; and
if operating in the second mode of operation, controlling the fuel flow such that substantially all the fuel is directed through the hot compressor bypass and the cold compressor bypass and substantially no fuel is directed through the fuel compressor.

3. The method according to claim 2, wherein the fuel delivery system is configured to measure a pressure of the fuel source;
further comprising the steps of:
automatically operating the fuel delivery system in the first mode of operation if the pressure of the fuel source is below a predetermined threshold pressure; and
automatically operating the fuel delivery system in the second mode of operation if the pressure of the fuel source is above the predetermined threshold pressure;
wherein the predetermined threshold pressure comprises a preferred fuel pressure level for the combustor; and
wherein the target temperature range for the fuel comprises the temperature range at which, given the measured heating value of the fuel, the fuel is within a targeted Modified Wobbe Index range for the combustion turbine engine.

4. A fuel delivery system for a combustion turbine engine, comprising:
a fuel line having a fuel compressor positioned between a first connection to a fuel source and a second connection to the combustor of the combustion turbine engine, wherein the fuel line further comprises parallel branches downstream of the fuel compressor: a cold branch that includes an after-cooler; and a hot branch that bypasses the after-cooler;
a rapid heating value meter configured to measure the heating value of a fuel from the fuel source and transmit heating value data relating to the measurements, wherein the rapid heating value meter comprises a device that provides heating value test results in less than approximately 30 seconds of beginning the testing process; and wherein the fuel delivery system is configured to test the fuel at regular intervals, the regular intervals being less than approximately 30 seconds;

means for controlling the amount of fuel being directed through the cold branch and the amount of fuel being directed through the hot branch; and a fuel-mixing junction at which the cold branch and the hot branch converge;

wherein the fuel-mixing junction resides in close proximity to a combustor gas control valve;

wherein the fuel line further comprises:

a hot compressor bypass, which connects to the fuel line at a position upstream of the fuel compressor and is configured such that a flow of fuel therethrough bypasses the fuel compressor and is carried to a heater and heated, and from the heater, the hot compressor bypass connects to the hot branch at a position upstream of the fuel-mixing junction; and a cold compressor bypass, which connects to the fuel line at a position upstream of the fuel compressor and is configured such that a flow of fuel therethrough bypasses the fuel compressor and the heater and connects to the cold branch at a position upstream of the fuel-mixing junction and downstream of the after-cooler;

further comprising a plurality of temperature measuring devices that are configured to measure fuel temperature and transmit fuel temperature data relating to the fuel temperature measurements, the plurality of temperature measuring devices being disposed along the fuel line at several locations to measure at least: a compressed fuel temperature that comprises the temperature of the fuel after being compressed by the fuel compressor; a cooled fuel temperature that comprises the temperature of the fuel after being cooled by the after-cooler; a heated fuel temperature that comprises the temperature of the fuel after being heated by the heater; a raw fuel temperature that comprises the temperature of the fuel in the cold compressor bypass; and a mixed fuel temperature that comprises the temperature of the fuel downstream of the fuel-mixing junction;

wherein the means for controlling includes a control unit that is configured to control the operation of one or more valves disposed along the fuel line;

wherein the control unit is configured to receive the fuel temperature data from the plurality of temperature measuring devices and the heating value data from the rapid heating value meter; and wherein, given the fuel temperature data received from the plurality of temperature measuring devices and the heating value data received from the rapid heating value meter, the control unit is configured to calculate a target temperature range and control the one or more valves such that a desired portion of the fuel is directed through the cold branch, a desired portion of the fuel is directed through the hot branch, a desired portion of fuel is directed through the hot compressor bypass, and a desired portion of fuel is directed through the cold compressor bypass so that the mixed fuel temperature downstream of the fuel-mixing junction achieves the target temperature range.

5. The fuel delivery system according to claim 4, wherein:
the target temperature range for the fuel comprises the temperature range at which, given the measured heating value of the fuel, the fuel comprises a target Modified Wobbe Index range for the combustion turbine engine;
the after-cooler comprises one of an air to gas heat exchanger and a liquid to gas heat exchanger;

the rapid heating value meter is configured to measure the heating value of the fuel and transmit heating value data relating to the measurements; and the one or more valves comprises one of: a) a two-way hot fuel control valve positioned on the hot branch and a two-way cold fuel control valve positioned on the cold branch; and b) a three-way valve positioned at the fuel-mixing junction.

6. The fuel delivery system according to claim 4, wherein the control unit is configured such that:
if an increase in the mixed fuel temperature is necessary given the target temperature range, the control unit controls the one or more valves to increase the portion of fuel directed through the hot branch of the fuel line; and
if a decrease in the mixed fuel temperature is necessary given the target temperature range, the control unit controls the one or more valves to increase the portion of fuel directed through the cold branch of the fuel line.

7. The fuel delivery system according to claim 4, wherein the fuel-mixing junction is positioned such that the length of fuel line between the fuel-mixing junction and the combustor gas control valve is between 2 and 20 meters.

8. The fuel delivery system according to claim 4, wherein the fuel-mixing junction is positioned such that the length of fuel line between the fuel-mixing junction and the combustor gas control valve is between approximately 6 and 10 meters.

9. The fuel delivery system according to claim 4, wherein the heater comprises a component selected from the following group: a water bath heater, a thermal oil bath heater, a direct fired heater, an electric heater, a heat pipe heat exchanger, a steam heater, a hot-water heater, and a heat exchanger that uses heat from the exhaust of the combustion turbine engine; and
wherein the after-cooler comprises one of an air to gas heat exchanger and a liquid to gas heat exchanger.

10. The fuel delivery system according to claim 4, wherein the fuel delivery system is selectively operable between at least two modes of operation including: a) a first mode of operation wherein the fuel compressor operates to compress the flow of fuel to the combustor; and b) a second mode of operation wherein the fuel compressor is inactive;
wherein:
in the first mode of operation, the control unit is configured to control the one or more valves such that substantially all the fuel is directed through the fuel compressor; and
in the second mode of operation, the control unit is configured to control the one or more valves such that substantially all the fuel is directed through the hot compressor bypass and the cold compressor bypass and substantially no fuel is directed through the fuel compressor.

11. The fuel delivery system according to claim 10, wherein, in the first mode of operation:
the desired portion of fuel being directed through the hot compressor bypass is substantially none;
the desired portion of fuel being directed through the cold compressor bypass is substantially none; and
the desired portion of fuel being directed through the cold branch and the desired portion of fuel being directed through the hot branch is controlled by the control unit so that the mixed fuel temperature downstream of the fuel-mixing junction is maintained within the target temperature range.

12. The fuel delivery system according to claim 10, wherein, in the second mode of operation:

the desired portion of fuel being directed through the hot branch from the fuel compressor is substantially none;

the desired portion of fuel being directed through the cold branch from the fuel compressor is substantially none; and the desired portion of fuel being directed through the cold compressor bypass and the desired portion of fuel being directed through the hot compressor bypass is controlled by the control unit so that the mixed fuel temperature downstream of the fuel-mixing junction is maintained within the target temperature range.

13. The fuel delivery system according to claim 10, further comprising means for measuring a pressure of the fuel source and communicating the pressure data relating to the pressure measurement to the control unit;

wherein the control unit is configured to automatically operate the fuel delivery system in the first mode of operation if the pressure of the fuel source is below a predetermined threshold pressure; and wherein the control unit is configured to automatically operate the fuel delivery system in the second mode of operation if the pressure of the fuel source is above the predetermined threshold pressure.

14. The fuel delivery system according to claim 13, wherein the predetermined threshold pressure comprises a preferred fuel pressure level for the combustor.

15. The fuel delivery system according to claim 4, wherein the target temperature range for the fuel comprises the temperature range at which, given the measured heating value of the fuel, the fuel is within a targeted Modified Wobbe Index range for the combustion turbine engine.

* * * * *